UNITED STATES PATENT OFFICE.

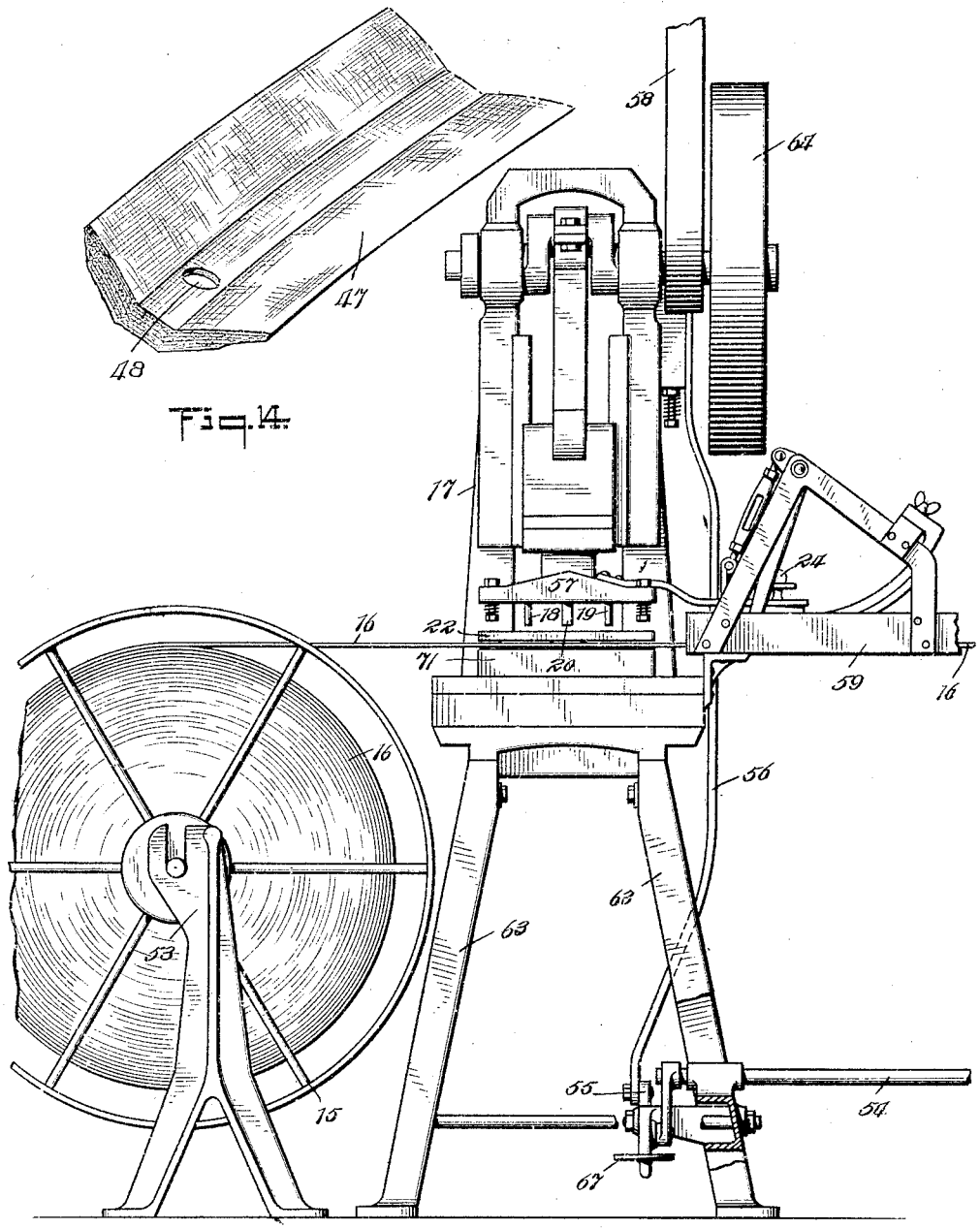

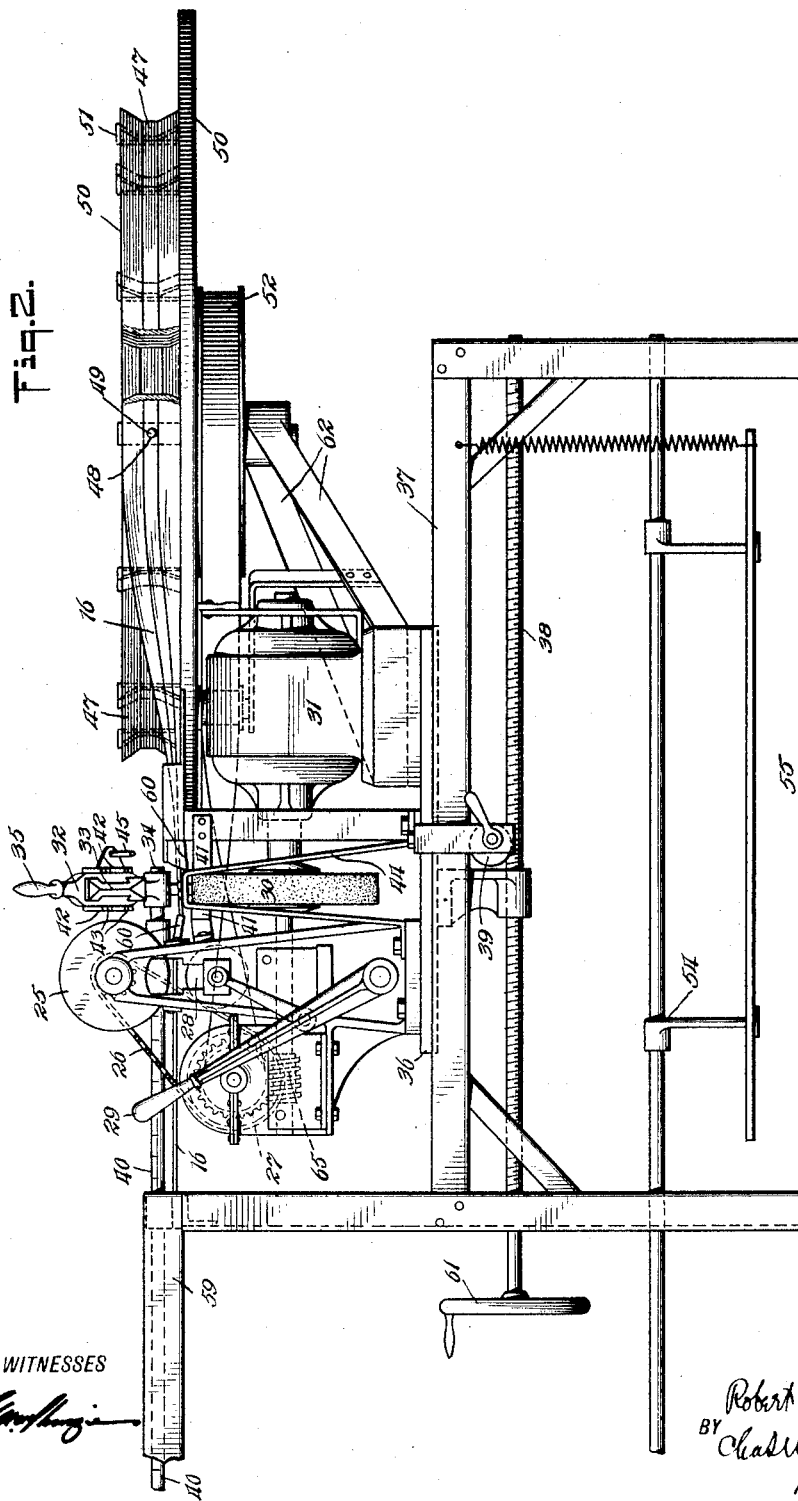

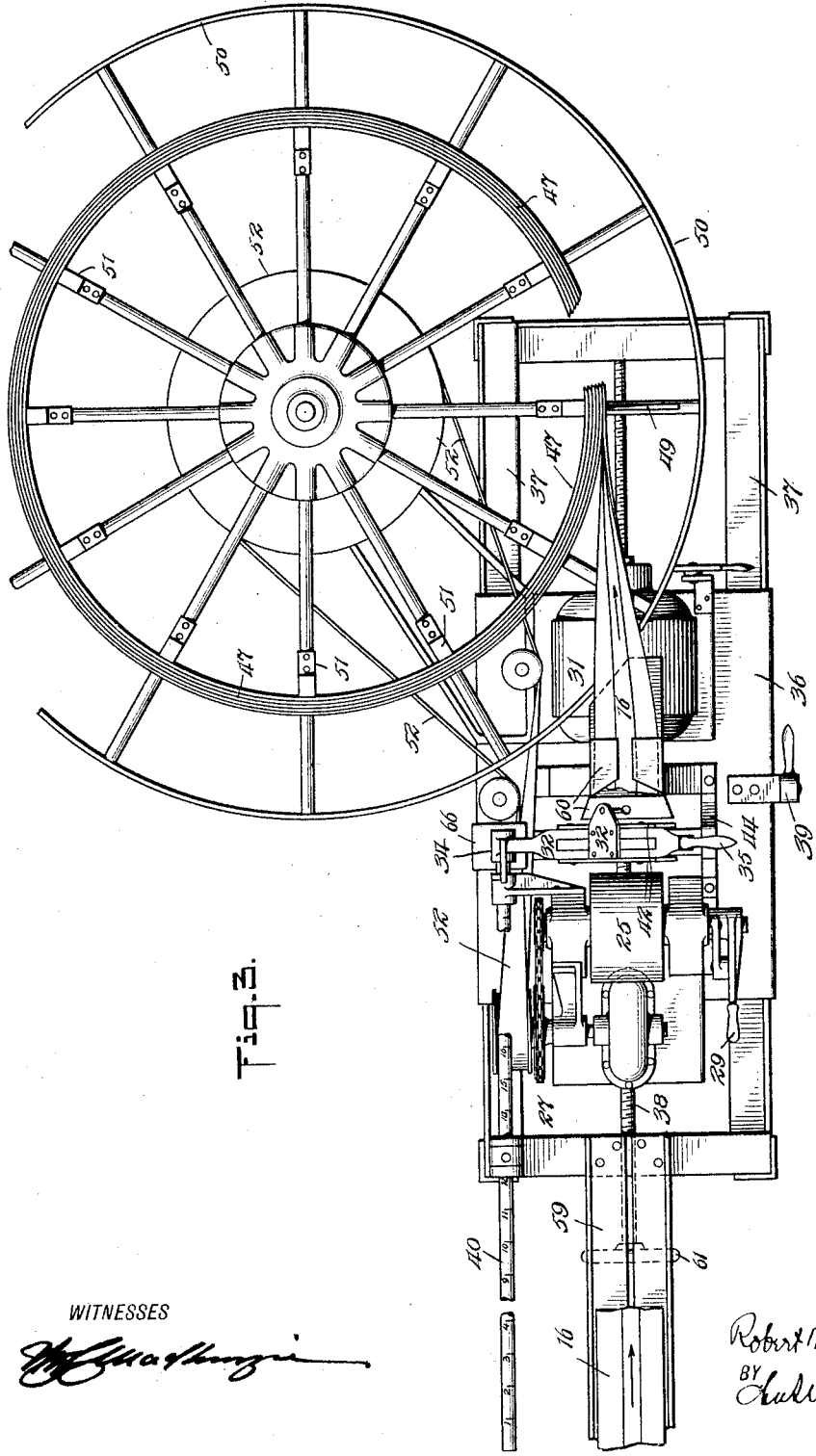

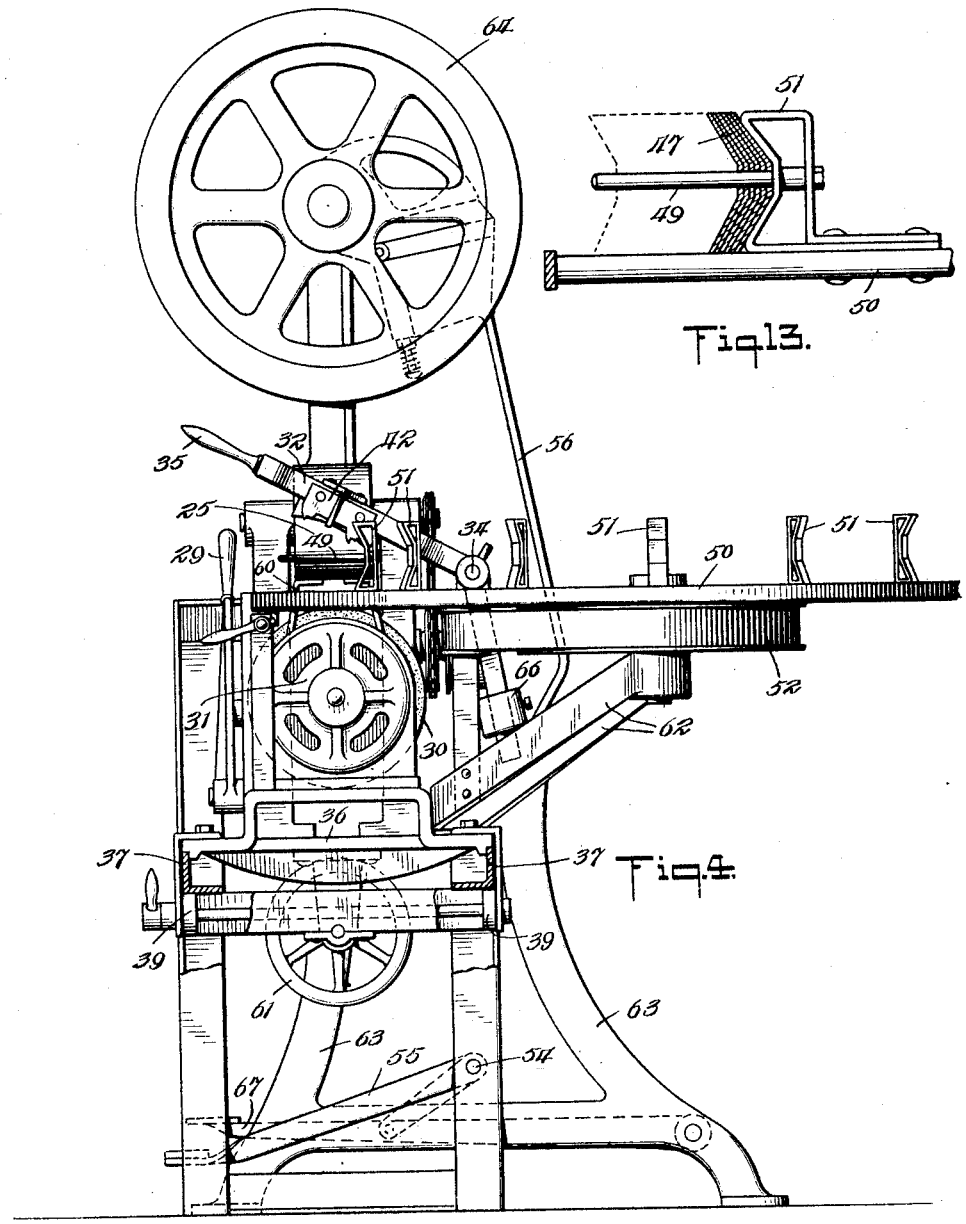

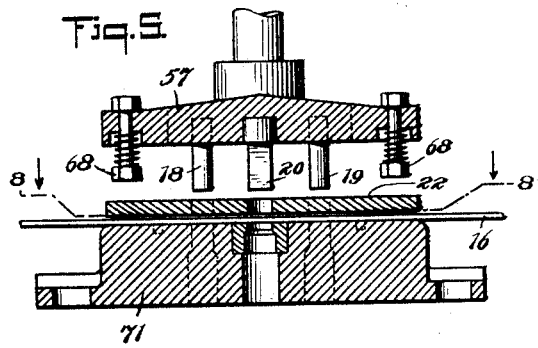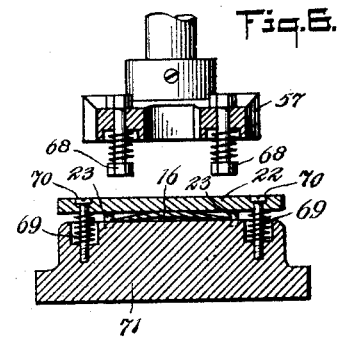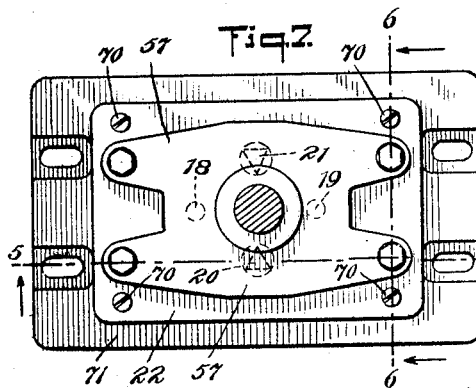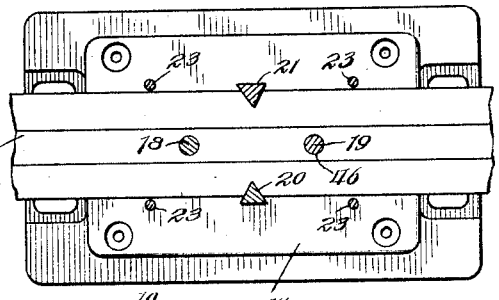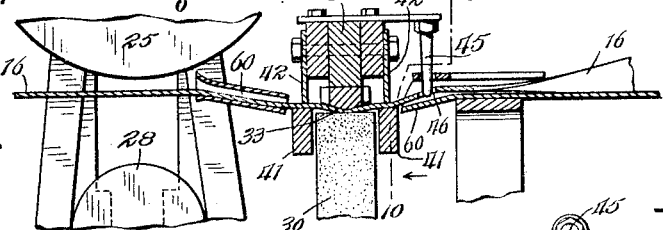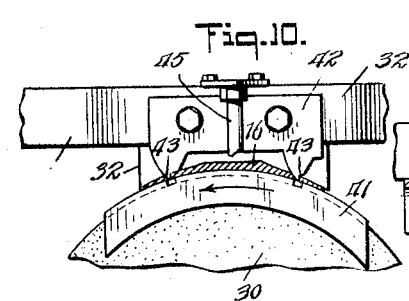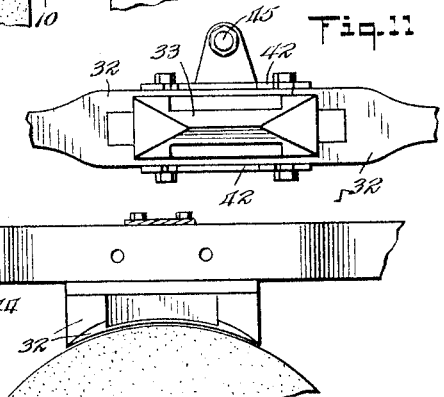

ROBERT McCLENATHEN, OF CUYAHOGA FALLS, OHIO, ASSIGNOR TO KELLY-SPRINGFIELD TIRE CO., OF NEW YORK, N. Y.

FLAP-FINISHING MACHINE.

1,321,139.           Specification of Letters Patent.           Patented Nov. 11, 1919.

Application filed April 14, 1919. Serial No. 289,820.

*To all whom it may concern:*

Be it known that I, ROBERT MCCLENATHEN, a citizen of the United States, residing at Cuyahoga Falls, in the county of Summit, in the State of Ohio, have invented a new and useful Flap-Finishing Machine, being a machine for finishing that member of a pneumatic tire which protects the inner tube from the metallic wheel-rim, of which the following is a specification.

In pneumatic tires the inner tube is protected, and its contact with the wheel rim prevented by what is known as a flap, which flap is an encircling ring or bed consisting of several layers of rubberized fabric of gradually diminished widths disposed centrally on each other and vulcanized together in a curved or flaring shape in cross section, and extending around the wheel between the metal rim and the inner tube, forming a seat or bed therefor, and which is about $3\frac{1}{2}$ inches in width circumferentially in cross section, and $\frac{1}{8}$ of an inch thick in the center, tapering away to an edge on either side.

The stock from which these flaps are made is usually run out and vulcanized in strips of continuous, and practically unlimited lengths, from which are cut pieces of any desired length to be finished into flaps; which finishing consists of punching holes near each end through which the valve stem passes; in numbering the flap; in trimming off the corners and in chamfering each end so that when assembled in the tire practically a smooth even surface is presented to the inner tube notwithstanding the ends of the flap are overlapped a few inches.

Heretofore the finishing of these flaps, that is, punching the holes, severing, chamfering the ends, numbering, and bundling the same, has been done by separate hand operations requiring much time and involving large expense. The object of my invention is to provide a machine which will take the strip of flap material from the reel, punch the same, cut off the corners, and number it automatically, and then advance the strip to a buffing and cutting emery wheel where it is automatically severed and the ends buffed or chamfered, after which it is advanced to the bundling reel and automatically bundled with other finished flaps.

The invention is illustrated in the accompanying drawings.

Figure 1, is an elevation of the punching and stamping part of the machine, including a portion of the supply reel with a strip of vulcanized flap stock thereon. Fig. 2 is an elevation of the remaining portion of the machine,—being the buffing and cutting part and bundling reel. Fig. 3, is a top plan view of the buffing and cutting part of the machine and bundling reel. Fig. 4, is a rear end elevation of the machine some minor parts not shown. Fig. 5, is a sectional view of the punching part of the machine, taken on line 5—5 of Fig. 7. Fig. 6, is a sectional view of the punching part, taken on line 6—6 of Fig. 7. Fig. 7, is a plan view of the bed piece of the punching part showing stem in section. Fig. 8, is a plan view of the bed piece of the punching part showing punches in section. Fig. 9, is a sectional view of a fragmentary part of the buffing and cutting part of the machine. Fig. 10, is a side elevation of a fragment of the emery buffing and cutting wheel and holding plate with holding die and flap in position for buffing and cutting. Fig. 11, is a bottom plan view of the holding die. Fig. 12, is a view similar to Fig. 10 with parts removed. Fig. 13, is a sectional view of a fragment of the rim of the bundling reel, showing severed flap ends, in section, deposited thereon. Fig. 14, is a perspective view of an end portion of a flap, showing chamfered end and hole for the valve stem.

Like numerals refer to like parts in all figures.

In the practice of my invention I provide a reel 15 on which is wound a strip of flap stock 16, which is fed through the machine in the manner hereinafter described.

The strip first passes through the punching press 17 provided with perforating punches 18 and 19 and two V-shaped side punches 20 and 21. This construction and positioning of punches is best shown in Fig. 8. It will be understood that in passing through the press 17, the strip 16 will receive two round perforations and two side V-shaped notches, so that the material forming the strip is partly severed by the V-shaped punches. In the punching press I use a stripper plate 22 and four guide pins 23 so that the strip 16 may be fed through the press in an even manner; and will not be displaced by the punches in perforating or cutting the same.

In the operation of the punching press 17, the numbering device 24 is also operated to place a number on the part of the strip 16 which extends under the numbering device. Any well known numbering machine may be used.

The next part of the machine in the order of operation is the advancing or feeding device consisting of a constantly rotating wheel 25, operable by a chain 26, wheel 27, pressure wheel 28, and lever 29, by means of which the wheel 28 can be brought into contact with the underside of strip 16, forcing the same against the wheel 25 whereby the strip is advanced, so long as the operator shall hold the wheel 28 in an elevated position so as to effect contact of the strip 16 with the wheel 25.

The grinding, or buffing wheel 30 is preferably in constant rotation; and may be driven by the motor 31, or in any desired manner. This wheel is located below the plane of travel of the strip 16, as shown in Fig. 2.

Above the grinding wheel is pivotally mounted the holding die 32, the face 33 of which is substantially V-shaped in cross section. This die is operable on its pivotal point 34 by the handle 35 so that the face thereof may be brought down to depress the strip 16 into contact with the grinding, or buffing wheel 30; and the grinding or buffing wheel 30 and die 32 are so shaped and positioned that when the strip 16 is depressed on the wheel 30, the die 32 will act as a forming die, as will be readily understood, so that the strip 16 will be severed by the buffing or grinding wheel, and the ends simultaneously chamfered.

The entire advancing grinding and bundling parts are carried on the frame 36 which may be moved along the bed pieces or guide angle bars 37 operable by the screw shaft 38 and is held in position by cam 39 while the scale rod 40 (shown best in Fig. 3) indicates the distance between the buffing or grinding wheel 30 and the punches so that wheel 30 will be located at the exact and proper distance from the punches according to the length of flap desired. It will be thus understood that the machine is adjustable to form flaps of different lengths.

On either side of the grinding, or buffing wheel 30 is mounted a plate 41 and the frame of the forming die 32 carries side plates 42 (best shown in Fig. 10) having points 43 adapted to prick into and hold the material of the flap 16 against the thrust of the grinding wheel 30 when in engagement therewith while the bracket or frame 44 limits the downward movement of the handle of the forming die 32 so that the angled face thereof 33, will not come into contact with the grinding or buffing wheel, so as to injure the same. The forming die 32 carries a registering pin 45 which as the die 32 descends enters the hole or perforation 46 in the strip 16 which has been made by the punching die 17, the result of which is to accurately determine the point of grinding and severing for if the hole or perforation 46 is not in register with the pin 45 so that it can enter the same, the forming die cannot be brought down to depress the strip of material into contact with the grinding or buffing wheel 30. In other words the pin and hole insure a severing exactly at the desired point and centrally between the V-shaped notches.

The face of the forming die 33 conforms to the contour of the flattened out strip of material and also the face of forming die 33 is shaped so as to press the proper amount of strip material on to the grinding wheel at the proper angle. In this way the strip is both chamfered and severed by the grinding operation and the flap 47 will have chamfered ends as shown in Fig. 14 and the outer edges will not only be chamfered but also rounded by reason of the fact that the punch in the first instance has cut away the material at the edges of the strip where the chamfering takes place.

As the strip 16 is fed forward or advanced by the wheel 25, the hole 48 in the end is caught on to the pin 49 of the bundling reel 50 by hand, which reel carries a plurality of standards 51 revolves, and pulls the strip along so that flaps 47 are deposited thereon in a circular manner. When the required number has been finished and wound upon the reel the same are tied together in a bundle and are ready for use.

The reel can be operated by power through the belt wheel 52, in which case suitable stops will be provided for the operation of this reel; or it may be operated in any desired manner.

In operation a supply reel 15, with the strip 16 of flap material wound thereon may be mounted in the standards 53, as shown, and the end thereof advanced to the punching press 17 by hand. When passed through this punching press the punches may be made to descend by means of the trip 55 thereby perforating this strip and cutting notches in the side thereof. After this operation the strip is further advanced by hand until brought into engagement with the advancing wheels 25 and 28 when by operating the lever 29 the strip may be further advanced until the perforation formed at the right of the notches by the punching die will register with the pin 45. At this time the notches formed by the V-shaped punches will be directly and centrally above the grinding or buffing wheel 30 which has been located at the desired distance from the punches being a distance equal to the length of the strip it is desired to finish into a flap. The forming die 32 may then be brought down thrusting the pin 45 through the perforation 46 and simultaneously depressing the strip of material into contact with the grinding, or buffing wheel 30 in a manner so that the strip may be ground in two, or severed at the point of the V-shaped notches and the ends chamfered. Simultaneously with the movement last described the lever rod 54 may be operated through foot lever rod 55 which trips punching die 17 through rod 56 causing punch holder 57 and its attached punches to descend perforating and notching the strip at the other end of the flap for the next cutting off process. The descent of punch holder 57 operates the numbering device 24 so that each flap is properly numbered.

The punching press may be operated by a belt 58 connected with a line shaft pulley or by any other well known means. It will be understood that the strip of flap material moves along between the punching and severing parts of the machine in the trough 59 and is further controlled by guides 60 in the grinding part. Screw shaft 38 may be operated by hand wheel 61. The bundling reel is supported by brackets 62 and the punching device by standards 63. The punching press is also equipped with the fly-wheel 64. In the grinding part, wheel 27 is operable by worm screw 65 and the lever 32 which carries the forming die 33 also carries a counter weight 66 on an extension arm so that the forming die is normally in an elevated position. Foot lever 67, Figs. 1 and 4, has the same function as lever 54. Either may be used to trip the punching press as may be most convenient for the operator.

The spring operated bolts in the punch holder conduce to smoothness in operation and spring 69 in conjunction with bolts 70 hold the stripper plate normally above the base plate 71 of the punching press, also for convenience and smoothness in operation.

It will thus be seen that I have provided a machine for the forming of these flaps from a continuous strip of flap material which is simple in construction and efficient for the purpose and which punches the holes in flaps of any desired length at precisely the same distance for each flap, which is of great importance as the valve stem passes through these holes and determines the dimensions of the circle which is formed by the flap in use and which must exactly coincide with that of the metal base rim as otherwise wrinkles are formed in the flap and the inner tube prematurely destroyed.

Having described my invention, I claim:—

1. In a machine for forming flaps for tires from a strip, a die adapted to cut a V-shaped notch on each side of said strip, and means to sever the material between said notches.

2. In a machine for forming flaps for tires from a strip, a die adapted to cut V-shaped notches in the opposite sides of said strip, means to sever the strip at said notches, and to chamfer the severed ends.

3. In a machine for forming flaps for tires from a strip, a die adapted to cut a notch on each side of said strip and simultaneously perforate the strip on each side of said notches, means to sever the material between said notches, and means to engage one of the perforations formed with said die while the material between the notches is being severed.

4. In a machine for forming flaps for tires from a strip, a die adapted to cut a notch on each side of said strip and simultaneously perforate the strip on each side of said notches, means to sever the material between said notches, means to engage one of the perforations formed with said die while the material between the notches is being severed, and means to chamfer the ends of said flaps.

5. In a machine for forming flaps for tires from a strip, a perforating and cutting die, a numbering device, and a severing and chamfering device, for the purpose set forth.

6. In a machine for forming flaps for tires from a strip, a perforating and cutting device, a measuring device, and a severing and chamfering device.

7. In a machine for forming flaps for tires from a strip, a perforating and cuttting device, a lever-operated advancing device, a measuring device, and a severing and chamfering device, for the purpose set forth.

8. In a machine for forming flaps for tires from a strip, a perforating and cutting die, a measuring device, a numbering device, and a severing and chamfering device, for the purpose set forth.

9. In a machine for forming flaps for tires from a strip, a perforating and cutting die, a measuring device, a numbering device, a severing and chamfering device, a feeding device, and a device adapted to engage one of the perforations formed by said perforating device while said severing and chamfering device is in operation.

10. A machine for forming flaps for tires from a strip, comprising a perforating and cutting die, a feeding device, a measuring device, a numbering device, a severing and chamfering device, a device adapted to engage one of the perforations formed by said die while the flap is being severed and chamfered, and a device adapted to form the flaps into bundles.

11. A machine for forming flaps for tires from a strip, comprising a perforating and cutting die, a lever-operated advancing device, a measuring device, a severing and chamfering device, a device adapted to engage one of the perforations formed by said perforating die while the flap is being severed and chamfered, and a device adapted to engage the perforation in the end of the unsevered flap and form the flaps into a bundle.

12. In a machine for forming flaps for tires from a strip, a perforating and cutting die, a measuring device, a grinding wheel, and lever mechanism adapted to depress the strip of material on said grinding wheel, for the purpose set forth.

13. In a machine for forming flaps for tires from a strip, a perforating and cutting die, a feeding device, a measuring device, a device adapted to enter one of the perforations formed by said die, a grinding wheel, and lever mechanism adapted to depress the strip of material on said grinding wheel with said device in engagement with said perforation.

14. In a machine for forming flaps for tires from a strip, a perforating and cutting die, a measuring device adapted to coöperate with a projection adapted to engage one of the perforations formed by said perforating die, and means to sever the strip and chamfer the severed end while the said projection is in operative connection with the perforation, for the purpose set forth.

15. In a machine for forming flaps for tires from a strip, a perforating and cutting die, a grinding wheel at a distance from said perforating and cutting die equal to the length of the flap, and a die adapted to press said strip upon said wheel in a manner that the strip may be severed and the ends chamfered.

16. In a machine for forming flaps for tires from a strip, a perforating and cutting die, a grinding wheel in rotation below the plane of travel of said strip and at a distance from said perforating and cutting die equal to the length of the flap, a feeding device adapted to advance the strip from said die to said grinding wheel, and a device adapted to depress said strip upon said wheel in a manner that a portion thereof may be severed and the ends thus severed be chamfered, for the purpose set forth.

17. In a machine for forming flaps for tires from a strip, a die adapted to cut a notch on each side of the strip and perforate the strip at each side of said notches, a grinding wheel below the plane of travel of the strip from said die, and means to depress said strip against said wheel in a manner whereby the space between the notches may be ground away and the edges of the notches chamfered, for the purpose set forth.

18. In a machine for forming flaps for tires from a strip, a die adapted to cut a V-shaped notch on each side of the strip and perforate the strip at each side of said notches, a grinding wheel below the plane of travel of the strip from the die,—means to depress said strip against said wheel in a manner whereby the material between the notches may be ground away and chamfered and the walls of the notches chamfered, and means to engage one of the perforations while the grinding wheel is in operation on the strip, for the purpose set forth.

19. In a machine for forming flaps for tires from a strip, a perforating and cutting die adapted to cut opposed notches in the opposite sides of the strip and perforate the same, means to sever the material of the strip between the notches intermediate of said perforations, and a bundling device adapted to engage the perforation in the unsevered portion of said strip, for the purpose set forth.

20. In a machine for forming flaps for tires from a strip, a perforating and cutting die adapted to cut opposed notches in the opposite sides of said strip and perforate the strip at each side of the notches a grinding wheel adapted to sever the material of the strip between said notches intermediate of said perforations and simultaneously chamfer the severed portions and walls of the notches, and a bundling device adapted to engage the perforation in the unsevered portion of said strip, for the purpose set forth.

21. A machine for forming flaps for tires from a strip comprising a die adapted to provide the strip with two perforations and intermediate, V-shaped notches in the opposed sides, a lever-operated advancing device, a grinding wheel located below the plane of travel of the strip from the die and at a distance from the die equal to the length of the strip, a measuring device adapted to determine the length of the flap, a numbering device, a device adapted to depress the strip of material upon said wheel in a manner whereby the material may be ground away leaving the ends chamfered, a trip adapted to operate said die from said depressing device, and a bundling device adapted to engage the perforation in the unsevered portion of the strip.

22. In a machine for forming flaps for tires from a strip, a die adapted to perforate the strip and cut notches in the sides thereof intermediate of the perforations, and a severing device adapted to sever the strip at the notches, said device being mounted in an adjustable frame whereby flaps of different lengths may be formed.

23. In a machine for forming flaps for tires from a strip, a die adapted to perforate the strip and cut notches in the sides thereof intermediate of the perforations, and a severing device adapted to sever the strip at the notches, said device being mounted in an adjustable frame whereby flaps of different lengths may be formed, and being positioned to cut said strip at an angle whereby the ends of each flap are chamfered, for the purpose set forth.

24. In a machine for forming flaps for tires from a strip, a die adapted to perforate the strip and cut notches in the sides thereof intermediate of the perforations, and a severing device adapted to sever the strip at the notches, said device being mounted in an adjustable frame whereby flaps of different lengths may be formed, and having a projection adapted to enter one of the perforations, for the purpose set forth.

25. In a machine for forming flaps for tires from a strip, a die adapted to perforate the strip and cut notches in the sides thereof intermediate of the perforations, a severing device adapted to sever the strip at the notches, said device being mounted in an adjustable frame whereby flaps of different lengths may be formed, and being positioned to cut said strip at an angle whereby the ends of each flap are chamfered, and a projection adapted to enter one of the perforations in said strip thereby permitting the operation of said cutting off device.

ROBERT McCLENATHEN.

Copies of this patent may be obtained for five cents each, by addressing the "Commissioner of Patents, Washington, D. C."